(12) United States Patent
Shin

(10) Patent No.: US 10,780,783 B2
(45) Date of Patent: Sep. 22, 2020

(54) ONBOARD VEHICLE COMMUNICATION SYSTEM

(71) Applicant: TOYOTA JIDOSHA KABUSHIKI KAISHA, Toyota-shi, Aichi-ken (JP)

(72) Inventor: Hirofumi Shin, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 35 days.

(21) Appl. No.: 15/812,503

(22) Filed: Nov. 14, 2017

(65) Prior Publication Data

US 2018/0141439 A1 May 24, 2018

(30) Foreign Application Priority Data

Nov. 18, 2016 (JP) ................................ 2016-225544

(51) Int. Cl.
| | |
|---|---|
| *H04L 12/40* | (2006.01) |
| *B60L 3/00* | (2019.01) |
| *H04L 12/46* | (2006.01) |
| *B60L 58/12* | (2019.01) |
| *B60L 53/60* | (2019.01) |
| *B60L 53/30* | (2019.01) |

(Continued)

(52) U.S. Cl.
CPC ........... *B60L 3/0084* (2013.01); *B60L 53/305* (2019.02); *B60L 53/60* (2019.02); *B60L 58/12* (2019.02); *H04L 12/40* (2013.01); *H04L 12/4625* (2013.01); *H04L 12/66* (2013.01); *H04B 1/3822* (2013.01); *H04L 2012/40273* (2013.01)

(58) Field of Classification Search
CPC ...... H02J 7/0004; H02J 7/0027; H02J 7/0054; H02J 7/0068; H02J 2007/0096; Y02T 10/7005; Y02T 90/14; Y02T 90/121; Y02T 90/128; Y02T 10/7072; Y02T 90/16; Y02T 90/163; Y02T 10/7077; H04L 2209/84; H04L 9/321; H04L 1/0025; H04L 1/0032; H04L 1/1671; H04W 4/046; H04W 88/02
See application file for complete search history.

(56) References Cited

U.S. PATENT DOCUMENTS

| | | | |
|---|---|---|---|
| 8,725,551 B2* | 5/2014 | Ambrosio | G06Q 30/02 705/7.31 |
| 2010/0017249 A1* | 1/2010 | Fincham | B60L 3/12 705/412 |

(Continued)

FOREIGN PATENT DOCUMENTS

| | | |
|---|---|---|
| EP | 3007309 A1 | 4/2016 |
| JP | 2009-292333 A | 12/2009 |
| JP | 2012010022 A | 1/2012 |

*Primary Examiner* — Sai Aung
(74) *Attorney, Agent, or Firm* — Hunton Andrews Kurth LLP

(57) ABSTRACT

An onboard vehicle communication system includes a first ECU configured to manage charge information of a vehicle, a gateway connected to the first ECU, a second ECU connected to the gateway, an onboard vehicle communication device configured to communicate with the outside of the vehicle, and a local bus that connects the first ECU and the onboard vehicle communication device. The first ECU is configured to transmit charge information of the vehicle to the onboard vehicle communication device via the local bus when an external charge device is charging a vehicle.

5 Claims, 3 Drawing Sheets

(51) Int. Cl.
*H04L 12/66* (2006.01)
*H04B 1/3822* (2015.01)

(56) References Cited

U.S. PATENT DOCUMENTS

| | | | |
|---|---|---|---|
| 2013/0024306 A1* | 1/2013 | Shah | G06Q 20/32 |
| | | | 705/17 |
| 2013/0141044 A1* | 6/2013 | Solomon | G06F 21/31 |
| | | | 320/109 |
| 2017/0136907 A1* | 5/2017 | Ricci | B60L 3/0015 |
| 2017/0136910 A1* | 5/2017 | Ricci | B60L 11/1829 |
| 2017/0140603 A1* | 5/2017 | Ricci | B60L 11/182 |
| 2018/0326854 A1* | 11/2018 | Okada | H04B 3/56 |

* cited by examiner

ONBOARD VEHICLE COMMUNICATION SYSTEM

CROSS-REFERENCE TO RELATED APPLICATION

The present application claims priority to Japanese Patent Application No. 2016-225544 filed on Nov. 18, 2016, which is incorporated herein by reference in its entirety.

BACKGROUND OF THE INVENTION

The present invention relates to an onboard vehicle communication system that transmits charge information of a vehicle charged with an external charge device out of the vehicle.

Japanese Laid-Open Patent Publication No. 2009-292333 describes an example of an onboard vehicle communication system known in the art that transmits and receives charge information of the vehicle to and from electronic control units (ECUs) installed in a vehicle when an external charge device is charging the vehicle. The charge information of the vehicle includes, for example, information of whether or not the vehicle is connected to and being charged by the external charge device and whether or not charging of the vehicle with the external charge device has been completed.

Research has been conducted to gather vehicle charge information from a plurality of vehicles charged with external charge devices at an external server. The external server is a vehicle external device that consolidates and manages the vehicle charge information. In this case, each vehicle needs to use an onboard vehicle communication device to transmit the charge information of the vehicle charged with the external charge device to the external server, which is located outside the vehicle.

The onboard vehicle communication device and the ECUs are normally connected by a gateway. Thus, the ECUs that manage charge information of a vehicle are required to route the charge information of the vehicle to the onboard vehicle communication device via the gateway.

However, the routing destination of charge information of the vehicle via the gateway is not limited to a communication bus that is connected to the onboard vehicle communication device, and the charge information of the vehicle may be routed to another communication bus that is not connected to the onboard vehicle communication device. In this case, even if the charge information of the vehicle does not need to be obtained, the ECU connected to the other communication bus needs to temporarily switch the operational state from a sleep state to a wake-up state in order to determine whether or not to receive the charge information of the vehicle routed from the gateway. This increases power consumption of the entire vehicle and decreases the efficiency for charging the vehicle.

SUMMARY OF THE INVENTION

It is an object of the present invention to provide an onboard vehicle communication system that limits decreases in the vehicle charging efficiency when an external charge device is charging the vehicle and charge information of the vehicle is transmitted out of the vehicle.

An onboard vehicle communication system that achieves the above object includes a first ECU configured to manage charge information of a vehicle, a gateway connected to the first ECU via a first global bus, a second ECU connected to the gateway via a second global bus, which is a communication bus that differs from the first global bus, an onboard vehicle communication device configured to communicate with the outside of the vehicle, and a local bus, which is a communication bus that is not connected to the gateway. The local bus connects the first ECU and the onboard vehicle communication device. The first ECU is configured to transmit charge information of the vehicle to the onboard vehicle communication device via the local bus when an external charge device is charging the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an onboard vehicle communication system will now be described with reference to the drawings.

Figure 1:
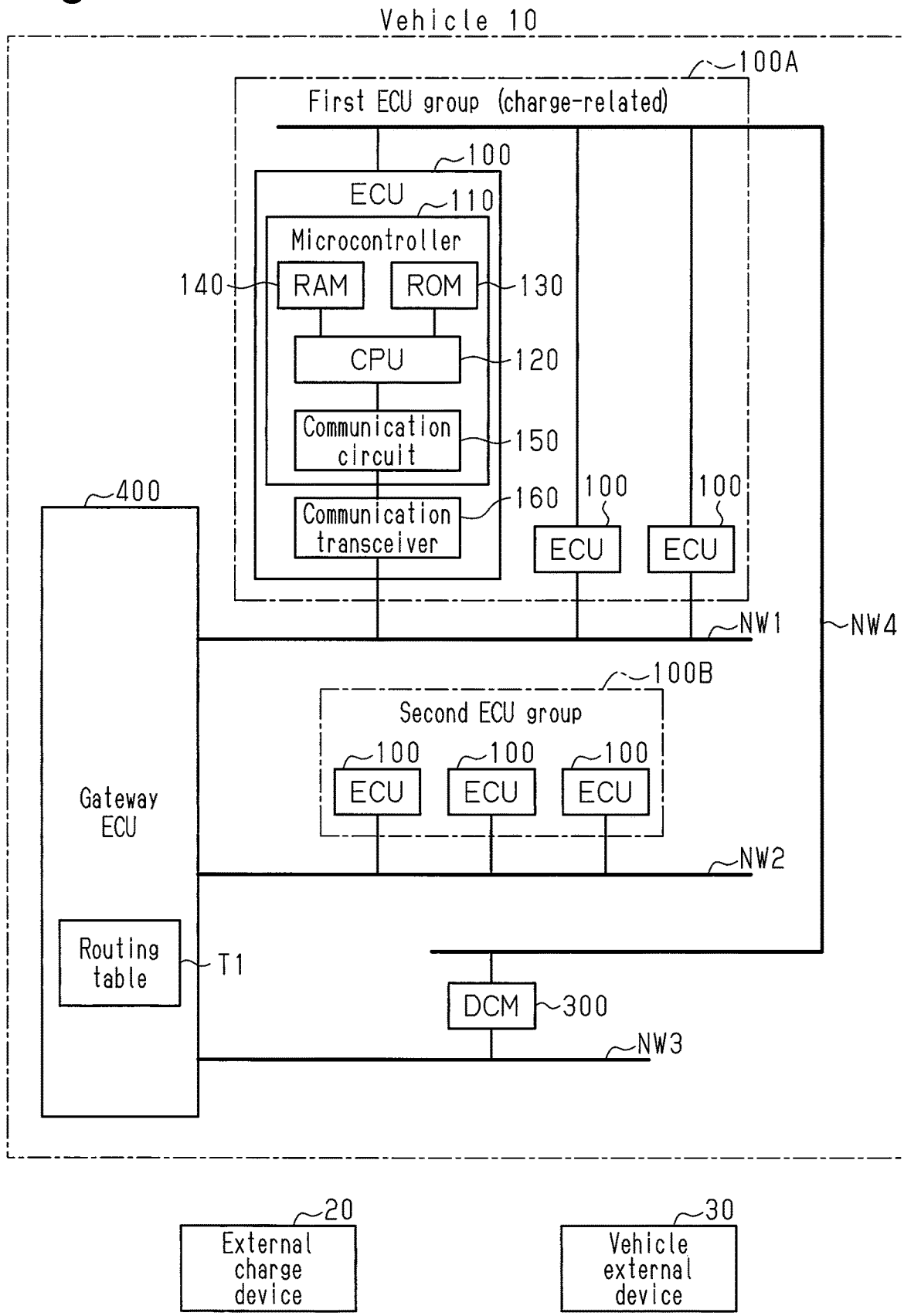
FIG. 1 is a schematic block diagram showing the configuration of one embodiment of an onboard vehicle communication system.

As shown in FIG. 1, the onboard vehicle communication system of the present embodiment includes a gateway ECU 400 arranged in a vehicle 10, global buses NW1 to NW3, which are communication buses connected to the gateway ECU 400, and electronic control units (ECUs) 100 and a data communication module (DCM) 300 connected to the global buses NW1 to NW3.

A first ECU group 100A connected to the first global bus NW1 includes a plurality of ECUs 100 that manage charge information of the vehicle 10. The ECUs 100 include, for example, a plug-in ECU, a battery ECU, and a hybrid ECU. When an external charge device 20 is connected to the vehicle 10, the plug-in ECU controls charging of the vehicle 10 with the external charge device 20. The battery ECU monitors a charge state of an onboard vehicle battery installed in the vehicle 10 and controls charging and discharging of the onboard vehicle battery. For example, the battery ECU may control charging and discharging of the onboard vehicle battery based on the detection result of a sensor arranged at a connection point of the external charge device 20 and the vehicle 10. The hybrid ECU sets the distribution (output ratio) of the power of an internal combustion engine and the power of an electric motor based on the detection results of various sensors. Further, based on the power distribution, the hybrid ECU generates a control signal related to discharging of the onboard vehicle battery and sent to the battery ECU and information related to the control amount of the engine calculated by an engine ECU.

A second ECU group 100B connected to the second global bus NW2 includes a plurality of ECUs 100 connected to the gateway ECU 400 via the second global bus NW2, which differs from the first global bus NW1. The ECUs 100 include, for example, a body ECU that controls the states of an air conditioner and mirrors of the vehicle 10 and body-related onboard vehicle devices such as meters that indicate various states of the vehicle 10 including, for example, the state of charge of the onboard vehicle battery.

The DCM 300, which serves as an onboard vehicle communication device, is connected to the third global bus NW3. The DCM 300 includes an external interface 340 (refer to FIG. 2) that communicates with the outside of the vehicle. The DCM 300 communicates with a vehicle external device 30 such as an external server located outside the vehicle 10. Further, the gateway ECU 400 connects the first and second ECU groups 100A and 100B to the DCM 300 via the global buses NW1 to NW3. The global buses NW1 to NW3 transmit and receive information in, for example, a control area network (CAN) that is in compliance with the CAN protocol, which is a communication protocol.

Each ECU 100 includes a microcontroller 110 and a communication transceiver 160. The microcontroller 110 performs information processing necessary to execute various controls based on information obtained from various sensors (not shown) and information obtained through a computation process. Various types of information related to a communication message are transmitted and received between the microcontroller 110 and the communication transceiver 160.

The microcontroller 110 includes a CPU 120, a ROM 130, a RAM 140, and a communication circuit 150. The CPU 120 controls operation of the entire microcontroller 110 by executing various programs stored in the ROM 130. The RAM 140 is a working memory of the CPU 120 and uses the programs and data stored in the ROM 130. The communication circuit 150 is connected to the communication transceiver 160 and transmits and receives various types of information to and from the gateway ECU 400, other ECUs 100, and the DCM 300 via the global buses NW1 to NW3.

The communication circuit 150 receives a message ID, communication data, transmission timing, and the like from the CPU 120. Then, based on the message ID and the communication data, the CPU 120 generates a communication message including the message ID and the communication data. The communication circuit 150 transmits the generated communication message to the corresponding global buses NW1 and NW2 from the communication transceiver 160 at the transmission timing. Further, the communication circuit 150 obtains the timing at which a communication message was received from the corresponding global buses NW1 and NW2, analyzes the received communication message, and obtains a message ID, communication data, and the like included in the communication message. In addition, the communication circuit 150 outputs information such as a reception timing of a communication message, a message ID, and communication data to the CPU 120.

The gateway ECU 400 relays a communication message of the CAN protocol among the first to third global buses NW1 to NW3. The gateway ECU 400 includes a routing table T1 that registers in advance the transmission destination of relayed communication messages for each type of communication data included in the communication messages.

The first ECU group 100A is connected to the DCM 300 via the first global bus NW1, the gateway ECU 400, and the third global bus NW3. Further, the first ECU group 100A is connected to the DCM 300 via a local bus NW4, which is a communication bus that is not connected to the gateway ECU 400. In the same manner as the global buses NW1 to NW3, the local bus NW4 transmits and receives information in compliance with, for example, the CAN protocol, which is a communication protocol specified by CAN.

Figure 2:
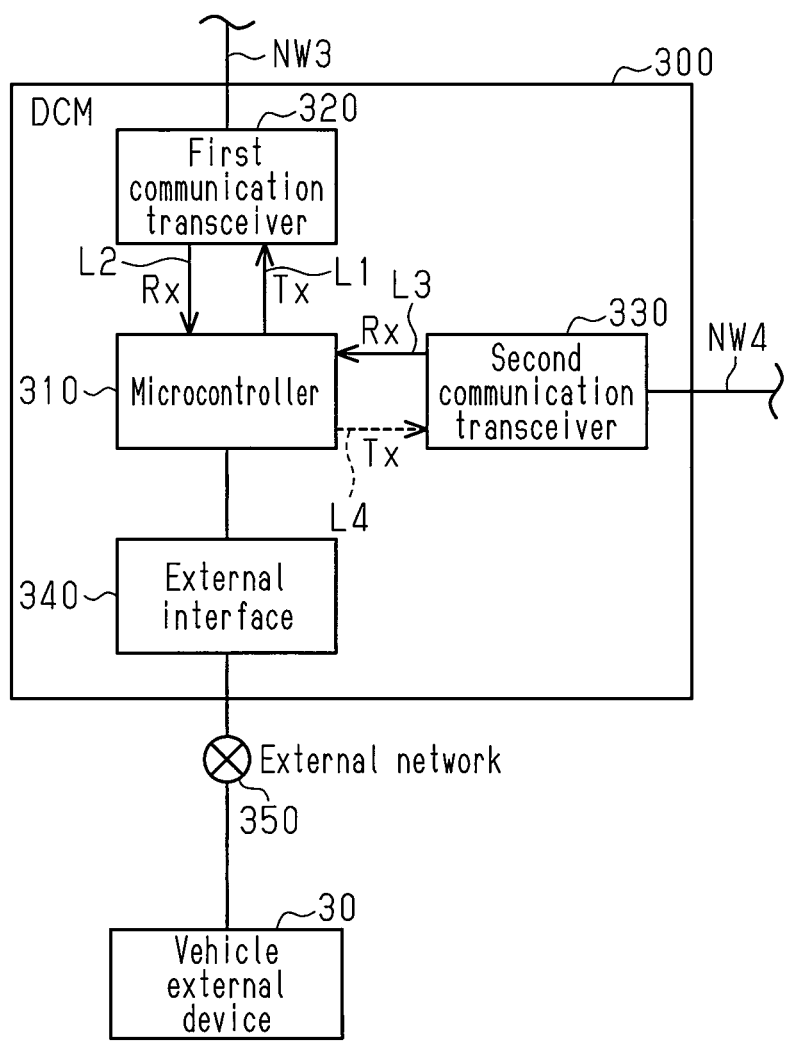
FIG. 2 is a block diagram showing the internal configuration of a DCM in the onboard vehicle communication system of FIG. 1.

As shown in FIG. 2, the DCM 300 includes a microcontroller 310, a first communication transceiver 320 corresponding to the third global bus NW3, a second communication transceiver 330 corresponding to the fourth local bus NW4, and an external interface 340.

The microcontroller 310 is connected to the first communication transceiver 320. The first communication transceiver 320 transmits and receives communication messages to and from the first ECU group 100A and the second ECU group 100B via the first to third global buses NW1 to NW3 and the gateway ECU 400 under the control of the microcontroller 310. Bidirectional signal lines L1 and L2 are connected between the microcontroller 310 and the first communication transceiver 320. More specifically, when the first communication transceiver 320 receives a communication message from the microcontroller 310 through the signal line L1, the first communication transceiver 320 transmits the received communication message via the third global bus NW3. Further, when the first communication transceiver 320 receives a communication message via the third global bus NW3, the first communication transceiver 320 outputs the received communication message to the microcontroller 310 through the signal line L2.

Further, the microcontroller 310 is connected to the second communication transceiver 330. The second communication transceiver 330 transmits and receives communication messages to and from the first ECU group 100A via the local bus NW4. A signal line L3 that permits the transmission of a communication message from the second communication transceiver 330 to the microcontroller 310 is connected between the microcontroller 310 and the second communication transceiver 330. However, a signal line L4 that permits the transmission of a communication message from the microcontroller 310 to the second communication transceiver 330 is not connected between the microcontroller 310 and the second communication transceiver 330. More specifically, when the second communication transceiver 330 receives a communication message from the first ECU group 100A via the local bus NW4, the second communication transceiver 330 outputs the received communication message to the microcontroller 310 through the signal line L3. Even if the microcontroller 310 acts to transmit a communication message from the second communication transceiver 330 via the local bus NW4, there is no signal line L4 that permits the transmission of a communication message from the microcontroller 310 to the second communication transceiver 330 as described above. Thus, a communication message from the second communication transceiver 330 is not transmitted via the local bus NW4. That is, a communication message from the first ECU group 100A to the DCM 300 can be transmitted between the first ECU group 100A and the DCM 300 via the local bus NW4, but a communication message from the DCM 300 to the first ECU group 100A cannot be transmitted.

In addition, the microcontroller 310 is connected to an external network 350 via the external interface 340. The microcontroller 310 transmits, to the external network 350 via the external interface 340, data included in a communication message obtained from the third global bus NW3 via the first communication transceiver 320 and data included in a communication message obtained from the fourth local bus NW4 via the second communication transceiver 330. Further, the microcontroller 310 transmits, from the first communication transceiver 320 to the third global bus NW3, a communication message including data obtained from the external network 350 via the external interface 340.

The operation of the onboard vehicle communication system of the present embodiment, in particular, the operation during the transmission of charge information of the vehicle 10 from the first ECU group 100A to the vehicle external device 30 when the external charge device 20 is charging the vehicle 10 will now be described.

Figure 3:
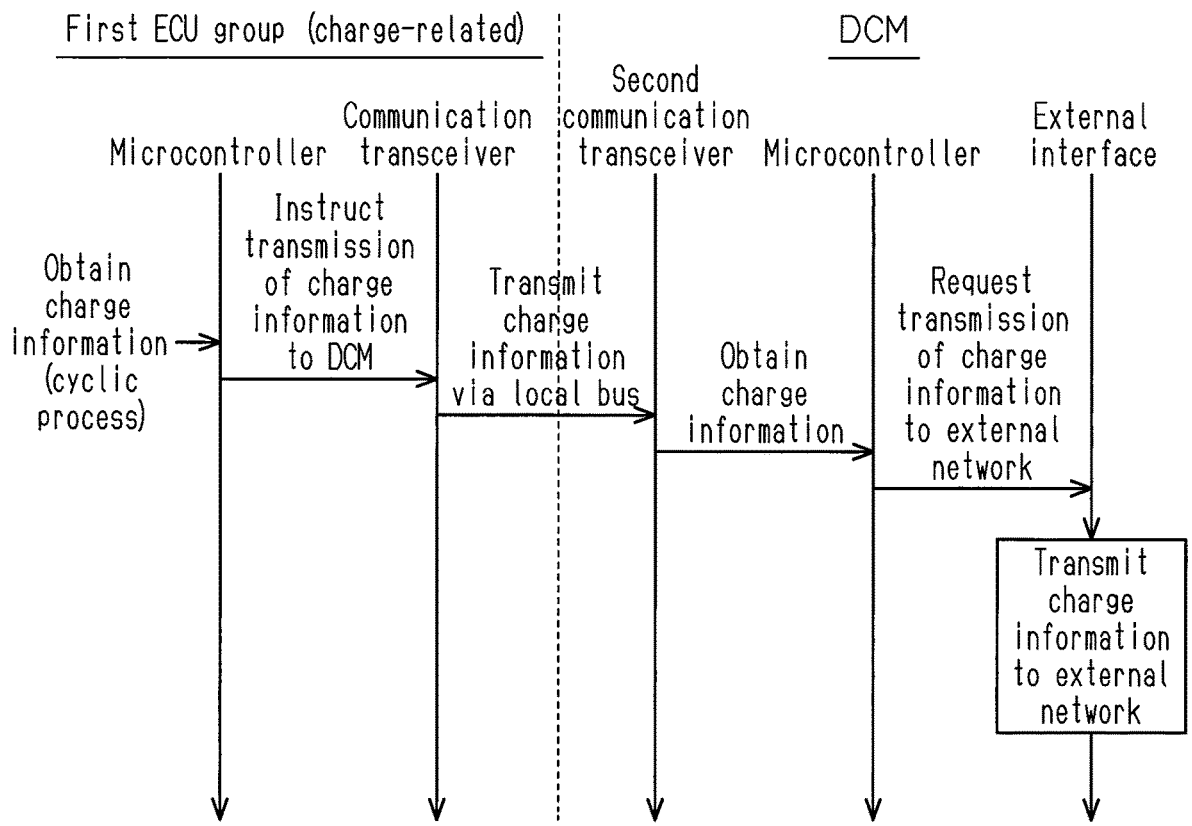
FIG. 3 is a sequence chart showing the flow of information when the onboard vehicle communication system of FIG. 1 transmits charge information of the vehicle out of the vehicle.

As shown in FIG. 3, when the external charge device 20 is connected to the vehicle 10 and an ignition switch of the vehicle 10 is turned off, the microcontroller 110 of the first ECU group 100A cyclically obtains charge information of the vehicle 10, for example, information indicating whether or not charging has been completed, information indicating the state of charge of the onboard vehicle battery when charging is performed, and information indicating charging is performed when the vehicle is still. Whenever the microcontroller 110 obtains charge information of the vehicle 10 in such a manner, the microcontroller 110 instructs the communication transceiver 160 to transmit a communication message including the obtained charge information of the vehicle 10 to the DCM 300 via the local bus NW4. As a result, the communication transceiver 160 transmits a communication message including the charge information of the vehicle 10 obtained from the microcontroller 110 to the DCM 300 through the local bus NW4.

The DCM 300 obtains from the second communication transceiver 330 a communication message transmitted from the first ECU group 100A via the local bus NW4. The second communication transceiver 330 outputs the obtained communication message to the microcontroller 310. Further, the microcontroller 310 instructs the external interface 340 to transmit, to the vehicle external device 30, charge information of the vehicle 10 included in the communication message obtained from the second communication transceiver 330. As a result, the external interface 340 transmits the charge information of the vehicle 10 obtained from the microcontroller 310 to the vehicle external device 30 through the external network 350.

More specifically, in the present embodiment, when the ignition switch of the vehicle 10 is turned off, the first ECU group 100A transmits the charge information of the vehicle 10 managed by the first ECU group 100A to the local bus NW4 instead of the global bus NW1. The local bus NW4 is a communication bus that is not connected to the gateway ECU 400. Thus, the charge information of the vehicle 10 transmitted from the first ECU group 100A is selectively transmitted to the DCM 300 via the local bus NW4 without being routed to another global bus (more specifically, second global bus NW2) via the gateway ECU 400. Thus, when charge information of the vehicle 10 is transmitted from the first ECU group 100A to the vehicle external device 30, the operational state of the ECU that does not require obtaining the charge information of the vehicle 10 no longer switches in an unnecessary manner from a sleep state to a wake-up state. This reduces the entire power consumption of the vehicle 10 when the vehicle 10 is being charged and improves the vehicle charging efficiency.

The operation of the onboard vehicle communication system of the present embodiment, in particular, the operation when the onboard vehicle communication system is accessed in an unauthorized manner via the external network 350 by an unauthorized ECU outside the vehicle 10 will now be described.

Figure 4:
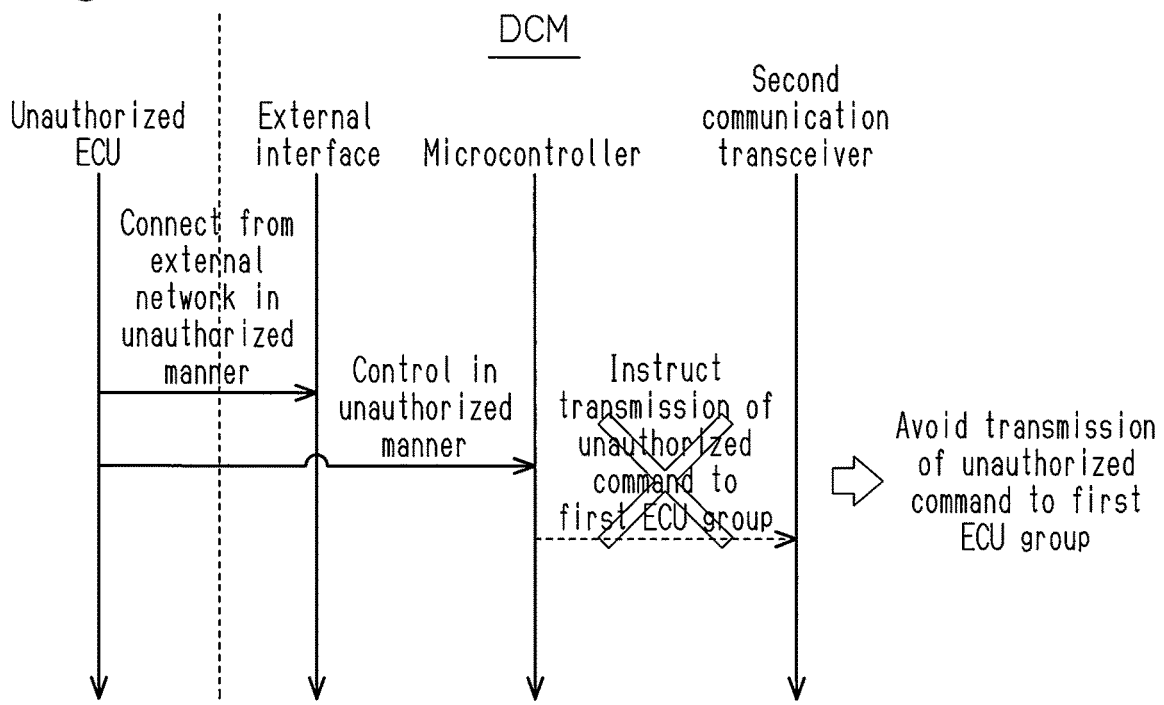
FIG. 4 is a sequence chart showing the flow of information when the onboard vehicle communication system of FIG. 1 is accessed in an unauthorized manner from outside the vehicle.

As shown in FIG. 4, when a malicious user attempts to control the first ECU group 100A in an unauthorized manner, an unauthorized ECU is normally connected to the external interface 340 of the DCM 300 through the external network 350. The unauthorized ECU controls the DCM 300 in an unauthorized manner by changing a control program of the microcontroller 310 of the DCM 300. As a result, the malicious user attempts to use the unauthorized ECU to remotely control the microcontroller 310 of the DCM 300 in an unauthorized manner and instruct the second communication transceiver 330 to transmit, to the first ECU group 100A, a communication message including an unauthorized command through the local bus NW4. The unauthorized command includes, for example, an operation command that changes the control program of the microcontroller 110 of the first ECU group 100A.

In this regard, in the present embodiment, although the signal line L3 that permits the transmission of a communication message from the second communication transceiver 330 to the microcontroller 310 is connected between the microcontroller 310 and the second communication transceiver 330, the signal line L4 that permits the transmission of a communication message from the microcontroller 310 to the second communication transceiver 330 is not connected between the microcontroller 310 and the second communication transceiver 330 as described above. Thus, the microcontroller 310 of the DCM 300 when controlled in an unauthorized manner cannot physically instruct the second communication transceiver 330 to transmit an unauthorized command. This avoids the transmission of an unauthorized command from the DCM 300 to the first ECU group 100A and increases the information security inside the vehicle 10.

As described above, the first embodiment has the following advantages.

(1) The first ECU group 100A and the DCM 300 are connected by the local bus NW4, which is a communication bus that is not connected to the gateway ECU 400. When the external charge device 20 is charging the vehicle 10, the first ECU group 100A transmits charge information of the vehicle 10 to the DCM 300 via the local bus NW4. Thus, during the transmission of charge information of the vehicle 10 to the vehicle external device 30 by the DCM 300 when the external charge device 20 is charging the vehicle 10, the charge information of the vehicle 10 is not routed from the first global bus NW1, which corresponds to the first ECU group 100A, to the second global bus NW2, which corresponds to the second ECU group 100B, via the gateway ECU 400. This avoids situations in which the operational state of the second ECU group 100B temporarily switches from the sleep state to the wake-up state in an unnecessary manner. Accordingly, decreases in the efficiency for charging the vehicle 10 with the external charge device 20 are limited when the operational state of the second ECU group 100B changes in such a manner.

(2) The DCM 300 includes the microcontroller 310 and the second communication transceiver 330 that transmits a communication message via the local bus NW4. Further, the microcontroller 310 and the second communication transceiver 330 are connected by the signal line L3 that permits the transmission of a communication message from the second communication transceiver 330 to the microcontroller 310 and not connected by the signal line L4 that permits the transmission of a communication message from the microcontroller 310 to the second communication transceiver 330. The communication message transmitted from the first ECU group 100A to the second communication transceiver 330 via the local bus NW4 is received by the microcontroller 310 from the second communication transceiver 330 through the signal line L3 and then transmitted from the microcontroller 310 through the external interface 340 to the vehicle external device 30. A signal line that permits the transmission of a communication message from the microcontroller 310 to the second communication transceiver 330 is not connected to the microcontroller 310. Thus, the microcontroller 310 cannot instruct the second communication transceiver 330 to transmit a communication message. Even if the DCM 300, which includes the external interface 340 that communicates with the vehicle external device 30, is controlled in an unauthorized manner, an unauthorized command is not transmitted from the DCM 300 to the first ECU group 100A via the local bus NW4. This allows the DCM 300 to transmit, to the vehicle external device 30, the charge information of the vehicle 10 obtained from the first ECU group 100A via the local bus NW4 while increasing the information security inside the vehicle 10 with a simplified configuration.

(3) The microcontroller 310 and the first communication transceiver 320 are connected by the signal line L2 that permits the transmission of a communication message from the first communication transceiver 320 to the microcontroller 310 and connected by the signal line L1 that permits the transmission of a communication message from the microcontroller 310 to the first communication transceiver 320. Thus, even if the DCM 300 is not configured to transmit a communication message from the microcontroller 310 to the local bus NW4 via the second communication transceiver 330, the DCM 300 can transmit a communication message from the microcontroller 310 to the third global bus NW3 via the first communication transceiver 320. That is, the DCM 300 enables bidirectional communication between the ECU 100 (for example, ECU 100 of first ECU group 100A) and the DCM 300 via the gateway ECU 400 while increasing the information security inside the vehicle 10 with the simplified configuration.

It should be apparent to those skilled in the art that the present invention may be embodied in many other specific forms without departing from the spirit or scope of the invention. Particularly, it should be understood that the present invention may be embodied in the following forms.

In the embodiment, a security device may be connected to the local bus NW4, which is a communication bus that connects the first ECU group 100A and the DCM 300. More specifically, the security device may be located in the local bus NW4. The security device determines whether or not received data is unauthorized data. When the received data is unauthorized data, the security device blocks the unauthorized data. In this case, the microcontroller 310 and the second communication transceiver 330 may be connected not only by the signal line L3 that permits the transmission of a communication message from the second communication transceiver 330 to the microcontroller 310 but also by the signal line L4 that permits the transmission of a communication message from the microcontroller 310 to the second communication transceiver 330.

In the embodiment, the DCM 300 includes the first communication transceiver 320 and the second communication transceiver 330 as communication transceivers that respectively correspond to the third global bus NW3 and the fourth local bus NW4. Instead, the DCM 300 may include a communication transceiver shared by the third global bus NW3 and the fourth local bus NW4 and switch the timing of transmitting a communication message using the shared communication transceiver via the third global bus NW3 and the fourth local bus NW4 under the control of the microcontroller 310.

In the embodiment, the DCM 300 is connected to the gateway ECU 400 via the third global bus NW3, which is a communication bus that differs from the first global bus NW1 and the second global bus NW2, and the DCM 300 is configured to communicate with each of the first ECU group 100A and the second ECU group 100B. However, the DCM 300 does not have to be connected to the gateway ECU 400 via the third global bus NW3.

In the embodiment, when the external charge device 20 is charging the vehicle 10, the DCM 300 obtains charge information of the vehicle 10 from the first ECU group 100A via the local bus NW4 and transmits the charge information of the vehicle 10 to the vehicle external device 30. Additionally, not only when the external charge device 20 is charging the vehicle 10 but also when the vehicle 10 is travelling, the DCM 300 may obtain charge information of the vehicle 10 from the first ECU group 100A via the local bus NW4 and transmit the charge information to the vehicle external device 30.

In the embodiment, the gateway ECU 400 is connected to the first ECU group 100A, the second ECU group 100B, and the DCM 300 via the global buses NW1 to NW3. However, the number of global buses connected to the gateway ECU 400 does not have to be three. Instead, the number of global buses connected to the gateway ECU 400 may be four or more as long as the global buses include at least global buses that respectively correspond to the first ECU group 100A that manages charge information of the vehicle 10, the second ECU group 100B connected to a global bus that differs from the first ECU group 100A, and the DCM 300 that communicates with the vehicle external device 30.

In the embodiment, the first ECU group 100A that transmits charge information of the vehicle 10 to the DCM 300 via the local bus NW4 includes a plurality of ECUs 100. However, the number of the ECUs 100 that transmit charge information of the vehicle 10 to the DCM 300 via the local bus NW4 does not have to be plural, and the number may be only one. The same applies to the number of the ECUs 100 that form the second ECU group 100B.

In the embodiment, each ECU 100 and the DCM 300 receive and transmit information via the global buses NW1 to NW3 and the local bus NW4 in compliance with the CAN protocol. However, a communication protocol other than the CAN protocol, for example, FLEXRAY (registered trademark) or ETHERNET (registered trademark) may be applied to a communication protocol used to receive and transmit information via the global buses NW1 to NW3 and the local bus NW4.

The microcontroller 110 of each ECU 100 does not have to include the CPU 120 and the memories (ROM 130 and RAM 140) and perform all the various processes described above with software. For example, the microcontroller 110 may include dedicated hardware (application-specific integrated circuit, ASIC) that performs at least some of the various processes. That is, the microcontroller 110 may be circuitry including (1) one or more dedicated hardware circuits such as ASIC, (2) one or more processors (microcomputers) that operate in compliance with computer programs (software), or (3) a combination of (1) and (2). The microcontroller 310 of the DCM 300 may be configured in the same manner.

The present examples and embodiments are to be considered as illustrative and not restrictive, and the invention is not to be limited to the details given herein, but may be modified within the scope and equivalence of the appended claims.

What is claimed is:

1. An onboard vehicle communication system comprising:
   a first electronic control unit (first ECU) including a first ECU microcontroller and a first ECU communication transceiver, the first ECU microcontroller including a processor for executing programs stored in memory and a communication circuit for receiving and transmitting information, wherein the first ECU configured to manage charge information of a vehicle;
   a gateway connected to the first ECU via a first global bus;
   a second electronic control unit (second ECU) including a second ECU microcontroller and a second ECU communication transceiver, the second ECU microcontroller including a processor for executing programs stored in memory and a communication circuit for receiving and transmitting information, wherein the second ECU connected to the gateway via a second global bus, which is a communication bus that differs from the first global bus;
   an onboard vehicle communication device configured to transmit information managed by the first ECU and the second ECU to the outside of the vehicle; and
   a local bus, which is a communication bus that is not connected to the gateway, wherein the local bus connects the first ECU and the onboard vehicle communication device, wherein
   the first ECU is configured to transmit charge information of the vehicle to the onboard vehicle communication device via the local bus and transmitting the charge information of the vehicle from the first ECU to the gateway is prohibited when an external charge device is charging the vehicle, and
   the first ECU, the gateway, the second ECU, the onboard vehicle communication device, the first global bus, the second global bus, and the local bus are installed inside the vehicle.

2. The onboard vehicle communication system according to claim 1, wherein
   the onboard vehicle communication device includes
   a controller and
   a communication transceiver configured to communicate a communication message via the local bus under control of the controller, and
   the controller and the communication transceiver are connected by a signal line that permits transmission of a communication message from the communication transceiver to the controller and not connected by a signal line that permits transmission of another communication message from the controller to the communication transceiver.

3. The onboard vehicle communication system according to claim 2, wherein
   the communication transceiver is a first communication transceiver,
   the onboard vehicle communication device further includes a second communication transceiver configured to communicate a communication message via a third global bus, which is a communication bus that differs from the first global bus and the second global bus, under control of the controller, and
   the second communication transceiver and the controller are connected by a signal line that permits transmission of a communication message from the second communication transceiver to the controller and connected by a signal line that permits transmission of a communication message from the controller to the second communication transceiver.

4. The onboard vehicle communication system according to claim 1, wherein
   the onboard vehicle communication device is connected to the gateway via a third global bus, which is a communication bus that differs from the first global bus and the second global bus.

5. The onboard vehicle communication system according to claim 1, wherein
   the onboard vehicle communication device includes
   a controller and
   a communication transceiver configured to communicate a communication message via the local bus, and
   the controller and the communication transceiver are connected by a signal line so that direct transmission of a communication message from the communication transceiver to the controller is permitted and direct transmission of another communication message from the controller to the communication transceiver is restricted.

* * * * *